US012762299B2

(12) United States Patent
Poskin et al.

(10) Patent No.: US 12,762,299 B2
(45) Date of Patent: Oct. 13, 2026

(54) GENERATING A MODEL TO SATISFY A REGION CONSTRAINT USING A QUADRATIC OBJECTIVE FUNCTION

(71) Applicant: The Boeing Company, Chicago, IL (US)

(72) Inventors: Jeffrey David Poskin, Black Diamond, WA (US); Thomas A. Hogan-Schmidt, Seattle, WA (US); Joerg Maximilian Xaver Gablonsky, Seattle, WA (US); Thomas Allan Grandine, Seattle, WA (US)

(73) Assignee: The Boeing Company, Chicago, IL (US)

(*) Notice: Subject to any disclaimer, the term of this patent is extended or adjusted under 35 U.S.C. 154(b) by 1135 days.

(21) Appl. No.: 17/838,620

(22) Filed: Jun. 13, 2022

(65) Prior Publication Data

US 2022/0414284 A1 Dec. 29, 2022

Related U.S. Application Data

(60) Provisional application No. 63/214,144, filed on Jun. 23, 2021.

(51) Int. Cl.

*G06F 30/15* (2020.01)
*G06F 111/04* (2020.01)
*G06F 111/10* (2020.01)

(52) U.S. Cl.

CPC .......... *G06F 30/15* (2020.01); *G06F 2111/04* (2020.01); *G06F 2111/10* (2020.01)

(58) Field of Classification Search

CPC ... G06F 30/15; G06F 2111/04; G06F 2111/10
See application file for complete search history.

(56) References Cited

U.S. PATENT DOCUMENTS 7,530,036 B2 * 5/2009 Nahir ............ G01R 31/318364 716/132
12,450,086 B1 * 10/2025 Brasch .................... G06F 17/11
2011/0029942 A1 * 2/2011 Liu ....................... G06F 30/327 716/102
2016/0076968 A1 * 3/2016 Bosetti .................. G01M 17/00 428/141
2017/0228473 A1 * 8/2017 Kang ...................... G06F 30/00
2022/0137961 A1 * 5/2022 Quirynen .............. G06F 9/3836 712/210

* cited by examiner

*Primary Examiner* — Kibrom K Gebresilassie
(74) *Attorney, Agent, or Firm* — Harrity & Harrity, LLP

(57) ABSTRACT

Methods and systems for developing a product using a model that satisfies a region constraint. Data is received. A region constraint is identified. A model that fits the data and satisfies the region constraint is identified using a quadratic objective function and a set of point constraints derived iteratively from the region constraint.

20 Claims, 10 Drawing Sheets

GENERATING A MODEL TO SATISFY A REGION CONSTRAINT USING A QUADRATIC OBJECTIVE FUNCTION

CROSS-REFERENCE TO RELATED APPLICATION

This application claims the benefit of U.S. Provisional Application No. 63/214,144 filed Jun. 23, 2021, and entitled "Modeling Based On Constraints," the disclosure of which is incorporated herein in its entirety.

FIELD

This disclosure generally relates to modeling and, more particularly, to method and systems for generating a model that satisfies a set of region constraints.

BACKGROUND

Engineering requirements typically manifest through specifying control over aspects of part geometry or over model or data behavior. This control may be defined using one or more point constraints, one or more region constraints, or both over an n-dimensional domain of a model with n independent variables. A point constraint is a condition or requirement that applies to an output of the model or a derivative of the model at a single point. For example, a point constraint may require a particular thickness at a particular x, y, z point of a part.

A region constraint for a model is a condition or requirement that applies to an output of the model or a derivative of the model for a region of points. For example, in manufacturing, a region constraint may specify that a part maintains a certain thickness over a defined region of the part geometry. As another example, in the creation of aircraft performance models, a region constraint may require that a particular performance model is monotonic or convex for a certain input region. Each region constraint may be defined as an infinite number of point constraints. Thus, in certain situations, the amount of time and processing resources required to handle region constraints may make generating a model that satisfies one or more region constraints impractical or more time-consuming and expensive than desired.

SUMMARY

In one example embodiment, a method is provided for developing a product using a model that satisfies a region constraint. Data is received. A region constraint is identified. A model that fits the data and that satisfies the region constraint is identified using a quadratic objective function and a set of point constraints derived iteratively from the region constraint.

In another example embodiment, a method for generating a model that satisfies a set of predefined constraints is provided. Data and the set of predefined constraints are received. The set of predefined constraints includes a set of region constraints. A set of constraints corresponding to a quadratic objective function is formed using any predefined point constraints in the set of predefined constraints and at least one point constraint identified from each region constraint in the set of region constraints. A candidate model solution to the quadratic objective function is computed such that the candidate model solution satisfies the set of constraints. A determination is made as to whether the candidate model solution satisfies the set of predefined constraints, including the set of region constraints. A new set of point constraints identified from the region constraint is added to the set of constraints in response to a determination that the model does not satisfy the region constraint. The steps of computing the candidate model solution to the quadratic objective function and determining whether the candidate model solution satisfies the set of predefined constraints based on the set of constraints that includes the new set of point constraints are repeated.

In yet another example embodiment, a computer system comprises a processor. The processor is configured to identify a region constraint; and identify a model that fits the data and satisfies the region constraint using a quadratic objective function and a set of point constraints derived iteratively from the region constraint.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and features thereof, will best be understood by reference to the following detailed description of an example embodiment of the present disclosure when read in conjunction with the accompanying drawings.

DETAILED DESCRIPTION

Figure 1:
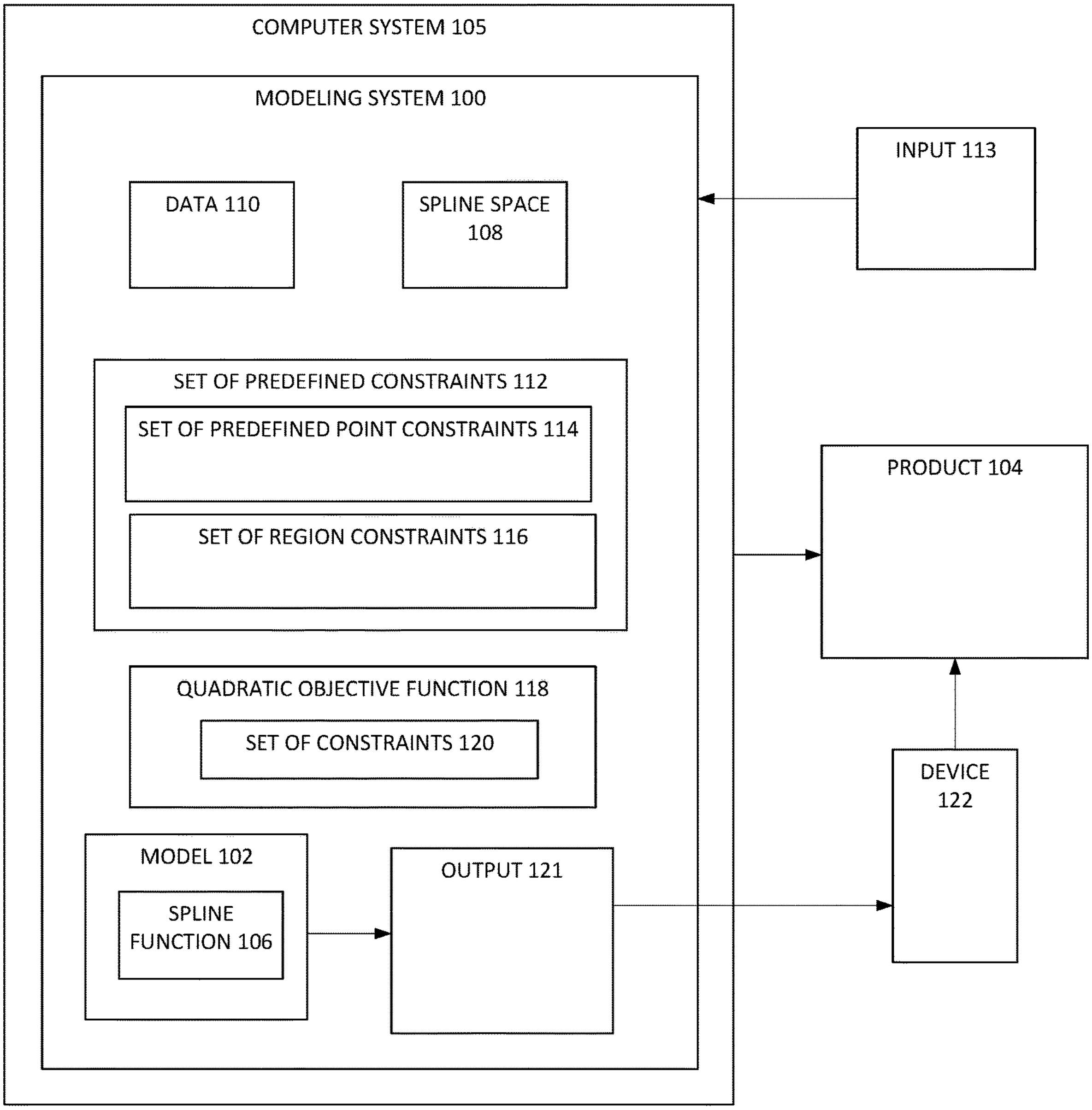
FIG. 1 is a block diagram of a modeling system in accordance with one or more example embodiments.

The example embodiments described herein recognize that data fitting is important to various applications including, for example, aerospace engineering applications. For example, being able to fit a model to data subject to constraints may be important to flight testing, geometric design, predictive shimming, as well as various other applications. These constraints may be defined based on, for example, engineering requirements, safety requirements, regulations, other information, or a combination thereof. In some cases, one or more constraints are defined based on the practical application for the model being fit to the data. For example, in certain areas of manufacturing (e.g., composite fabrication or additive manufacturing), a part definition may need to meet certain strict geometric conditions to be practically producible. When these constraints include region constraints, the processing time and resources needed to identify a model that fits the data subject to the region constraints may be prohibitive or impractical.

Some currently available methods for generating models while taking into account region constraints involve using semidefinite programming, which expands the number of variables involved and add increased complexity. Accordingly, such methodologies restrict the size of problems that can be reasonably solved, making these methodologies less useful for industrial use. Some currently available methodologies handle region constraints by making assumptions about the constraints. For example, a region constraint that is defined as an infinite number of point constraints may be replaced with a set of conditions that relax the true requirements of the region constraint. This type of relaxation, however, may result in models that violate the true region constraint. Such model solutions may be infeasible for use in safety-critical applications, including aircraft part design and manufacturing. Still other currently available methodologies may replace a region constraint with a stricter set of conditions to thereby remove a region of the available design space for the model. Such methodologies may result in models and parts being produced with increased cost or performance that is less than desired.

Thus, the example embodiments described herein provide a modeling system (e.g., a modeling toolkit or model optimization toolkit) that uses semi-infinite programming techniques to efficiently produce models that satisfy a set of predefined constraints, the set of predefined constraints including at least one region constraint. More particularly, the example embodiments described herein provide methods and systems for handling one or more region constraints by considering a subset of point constraints derived from each region constraint that iteratively evolves until a model that best fits the data while satisfying the one or more region constraints is identified. The example embodiments provided herein enable a product to be developed that meets a set of predefined constraints.

The subset of point constraints derived from each region constraint at each iteration may be considered a relaxation of potentially infinite number of point constraints defined by or contained within a region constraint.

The capability to handle such predefined constraints, including region constraints, may be useful in developing a product. For example, being able to produce a model that meets these predefined constraints may allow a certificate of feasibility to be provided for the development of a part (e.g., aircraft part) in manufacturing applications. Further, the process for generating a model as described herein may enable an entire design space for a part to be explored, which may enable one or more feasible part definitions for a part to be identified where a single feasible option might otherwise not be identifiable via various currently available methodologies.

Referring now to the figures, FIG. 1 is a block diagram of a modeling system in accordance with one or more example embodiments. Modeling system 100 is used to generate model 102 for use in developing or managing product 104. Product 104 may take any of a number of different forms. For example, product 104 may be a structure, an assembly, a part, a system, a surface of a part or structure, a software tool, a process or procedure, a model, or some other type of product.

As used herein, the development of product 104 may include designing, manufacturing, fabricating, assembling, testing or inspecting, certifying, validating, refining, updating, or performing some other type of development task with respect to product 104. In some cases, the development of product 104 may include repairing product 104 or performing maintenance or service of product 104. Managing product 104 may include monitoring the performance of product 104, updating product 104, retrofitting product 104, improving product 104, or performing some other action over the life of product 104.

Modeling system 100 may be implemented using hardware, software, firmware, or a combination thereof. When software is used, the operations performed by modeling system 100 may be implemented using, for example, without limitation, program code configured to run on a processor unit. When firmware is used, the operations performed by modeling system 100 may be implemented using, for example, without limitation, program code and data and stored in persistent memory to run on a processor unit.

When hardware is employed, the hardware may include one or more circuits that operate to perform the operations performed by modeling system 100. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In one or more examples, modeling system 100 is implemented within computer system 105. Computer system 105 may take the form of any of a number of different types of computing platforms. For example, computer system 105 may include a single computer or multiple computers in communication with each other. In some examples, computer system 105 may take the form of a cloud computing system, a smartphone, a tablet, or some other type of computing platform.

As described above, modeling system 100 is used to generate model 102 for use in developing or managing product 104. As used herein, a model, such as model 102, may comprise one or more algorithms, equations, formulas, or combination thereof for use in capturing the behavior of or a geometric representation of the subject (e.g., part, structure, system, etc.) being modeled. In one or more examples, model 102 mathematical representation of a surface of an object. Model 102 may be one-dimensional or multi-dimensional. In some examples, model 102 may be a computer program that is designed to simulate what might occur in a given situation or what did occur in a given situation.

Model 102 may be used in various scenarios in the development of product 104. In some examples, model 102 may be used to geometrically represent a design for product 104 such that product 104 can be manufactured, assembled, or fabricated using model 102. In other examples, model 102 is used to analyze the performance of product 104. For example, product 104 may be an aircraft control surface and model 102 may represent a performance of the aircraft control surface with respect to some performance parameter.

In one or more examples, model 102 takes the form of spline function 106. Spline function 106 may be a function constructed from piecewise polynomial functions. For example, spline function 160 may be a function in spline space 108, where spline space 108 is an n-dimensional spline space $S_{k,t}$ with integer k indicating the order of the piecewise polynomial functions and a knot sequence t where:

$$t=(t_1, \ldots, t_{n+k}) \text{ and} \tag{1}$$

$$t_1=\ldots=t_k<t_{k+1}\leq\ldots\leq t_n<t_{n+1}=\ldots=t_{n+k}. \tag{2}$$

In these examples, a basis for spline space 108, S, may comprise tensor products of the B-spline bases for each $S_{k,t}$. Thus, any function, f(x), of spline space 108, and thereby spline function 106, may be uniquely represented via B-spline basis:

$$f(x)=\Sigma_\alpha c_\alpha B_\alpha(x) \tag{3}$$

for any $$x\in\Omega \tag{4}$$

where $$\alpha=(\alpha_1, \ldots, \alpha_m)\in\mathbb{N}^m \tag{5}$$

is a multi-index and $$B_\alpha(x)=B_{\alpha_1,k_1,t_1}(x_1)\ldots B_{\alpha_m,k_m,t_m}(x_m). \tag{6}$$

Modeling system 100 searches spline space 108 to produce spline function 106 that fits data 110. Data 110 may be design data, sensor data, observed or measured data, another type of data, or a combination thereof. In one or more examples, modeling system 100 generates spline function 106 to fit data 110 subject to set of predefined constraints 112. Fitting spline function 106 to data 110 comprises constructing spline function 106 such that it has the best fit to data 110, subject to set of predefined constraints 112.

Set of predefined constraints 112 includes one or more constraints that are predetermined. For example, set of defined constraints 112 may be included in input 113 that is received by modeling system 100. Input 113 may be user input or may be input received from a computer system, a cloud, a database, or some other source.

Set of predefined constraints 112 may include, for example, set of predefined point constraints 114, set of region constraints 116, or both. As previously described, a point constraint, such as a point constraint in set of predetermined point constraints 114, is a condition or requirement that applies to an output of a model, such as spline function 106, or a derivative of that model at a single point.

A region constraint, such as a region constraint in set of region constraints 116, is a condition or requirement that applies to an output of a model, such as spline function 106, or a derivative of that model for a region of points. In one or more examples, a region constraint may be defined as a continuum of points having at least one bound (e.g., an upper bound, a lower bound, or both).

Modeling system 100 uses quadratic objective function 118 to fit data 110 to spline function 106 subject to set of predefined constraints 112. For example, modeling system 100 may include a quadratic program for identifying a solution to quadratic objective function 118. In one or more examples, identifying this solution comprises optimizing quadratic objective function 106 subject to set of constraints 120.

Set of constraints 120 may include at least a portion of set of predefined constraints 112, one or more constraints derived from set of predefined constraints 112, or both. For example, set of constraints 120 may include set of predefined point constraints 114 and set of point constraints 115 that are derived iteratively from set of region constraints 116.

Optimizing quadratic objective function 118 may comprise minimizing or maximizing quadratic objective function 118. For example, quadratic objective function 106 may have a feasible region within which a solution is present. Optimizing quadratic objective function 118 may include identifying the solution within that feasible region that minimizes or maximizes quadratic objective function 118.

In one or more examples, quadratic objective function 118 takes the form of a least squares penalty function:

$$f(c)=\sum_{i=1}^{d}\left(s\left(x^i;c\right)-y_i\right)^2, \tag{7}$$

which can be represented in the decision variables c as:

$$f(c)=c^TB(x)^TB(x)c-2c^TB(x)^Ty+y^Ty \tag{8}$$

where $$y=(y_1, \ldots, y_d)^T\in\mathbb{R}^d \tag{9}$$

and B(x) is the d x n matrix whose rows are he values of the B-spline basis evaluated at each point $x^i$. And because $$B(x)^TB(x)\succeq 0, \tag{10}$$

quadratic objective function 118 is convex.

Examples of a manner in which modeling system 100 may produce model 102 are described below in greater detail with respect to FIGS. 2-8.

Model 102 may be used in the development of product 104 in various ways. As one example, modeling system 100 may use model 102 to generate output 121. Output 121 may be a file, a group of files, a table, a database, a graphical output, or some other type of output that contains model 102 either in its original form or in a modified or converted form.

Output 121 may be sent to device 122 for use in the development of product 104. Device 122 may take a number of different forms. For example, device 122 may be a display device for use in displaying model 102. In another example, model 102 may take the form of a product definition and device 122 may be a three-dimensional (3D) printer that uses model 102 to build product 104. In yet another example, device 122 may be another computer system or a server located remotely with respect to computer system 105. In still other examples, device 122 is a numerically-controlled machine and output 121 includes instructions for the numerically-controlled machine based on model 102.

The block diagram of FIG. 1 is not meant to imply physical or architectural limitations to the manner in which an example embodiment may be implemented. Other components in addition to or in place of the ones illustrated may be used. Some components may be optional. Further, the blocks are presented to illustrate functional components. One or more of these blocks may be combined, divided, or combined and divided into different blocks when implemented in an example embodiment.

Figure 2:
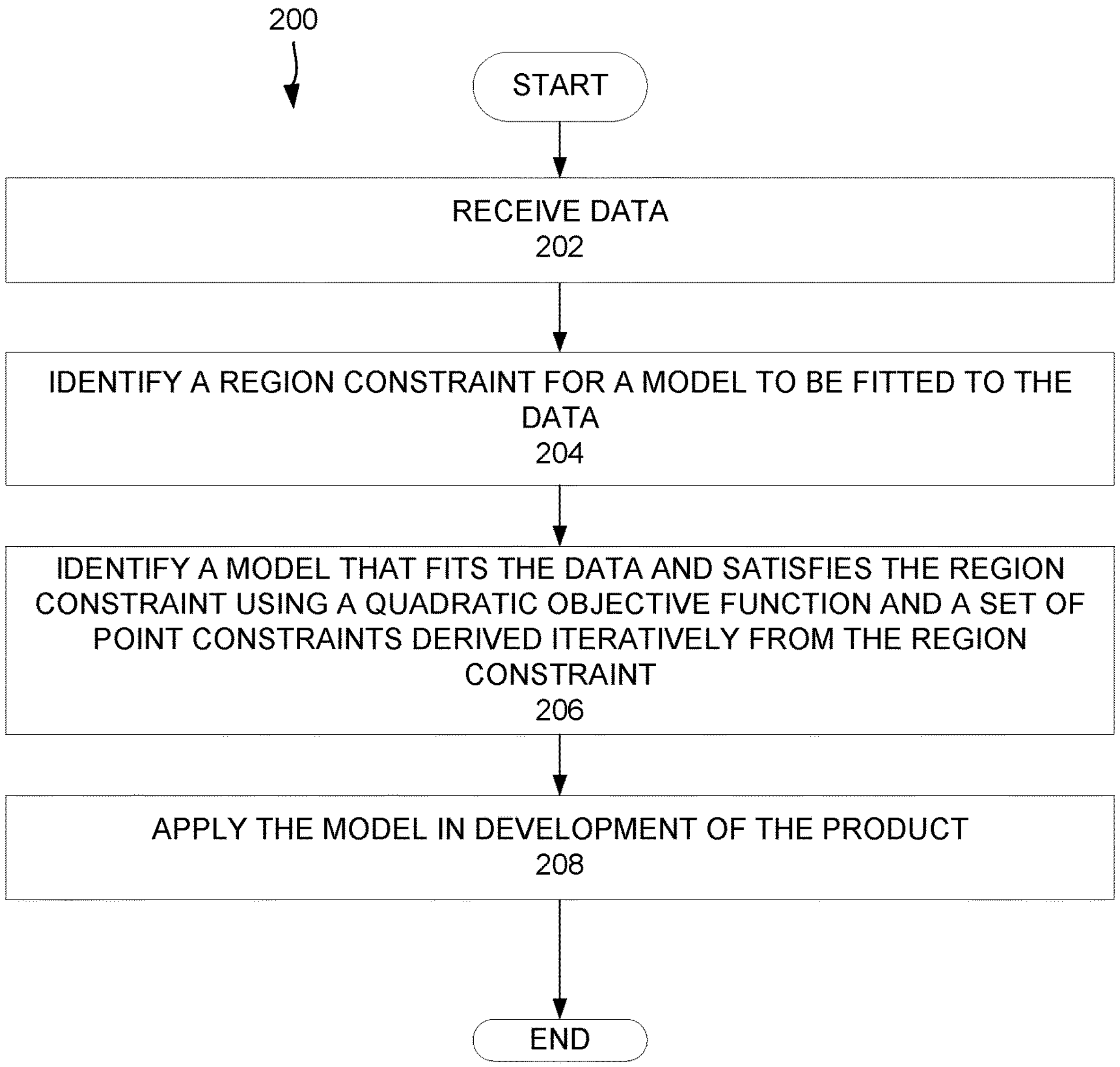
FIG. 2 is a flowchart of a process for generating a model for use in developing a product in accordance with one or more example embodiments.

FIG. 2 is a flowchart of a process for generating a model for use in developing a product in accordance with one or more example embodiments. Process 200 in FIG. 2 may be implemented using modeling system 100 in FIG. 1.

Process 200 may begin by receiving data (operation 202). This data may be, for example, data 110 described in FIG. 1 above. This data may include sensor data, observed or measured data, design data, another type of data, or a combination thereof.

A region constraint is identified for a model to be fitted to the data (operation 204). The region constraint may be, for example, a region constraint in set of region constraints 116 in FIG. 1.

A model that fits the data and satisfies the region constraint is identified using a quadratic objective function and a set of point constraints derived iteratively from the region constraint (operation 206). Operation 206 includes identifying a coefficient matrix for the model that uniquely defines the model within a model space. For example, the model may comprise a spline function. The spline function may be represented as a tensor product of B-spline bases corresponding to a spline space. Operation 206 includes identifying the coefficient matrix that uniquely defines the spline function within a feasible region of the spline space that optimizes the quadratic objective function. Optimizing the quadratic objective function may include, for example, minimizing the quadratic objective function or maximizing the quadratic objective function. The quadratic objective function may be, for example, quadratic objective function 118 in FIG. 1.

The model is then applied in development of the product (operation 208), with the process terminating thereafter. For example, a part may be manufactured, fabricated, or assembled using the model. The model may, for example, provide at least a portion of the design and geometry for the part. As another example, the model may represent the performance of a part or system based on observed or measured data received in operation 202. This type of model may be used to improve or update the part or system, retrofit the part or system, or redesign the part or system.

Figure 3:
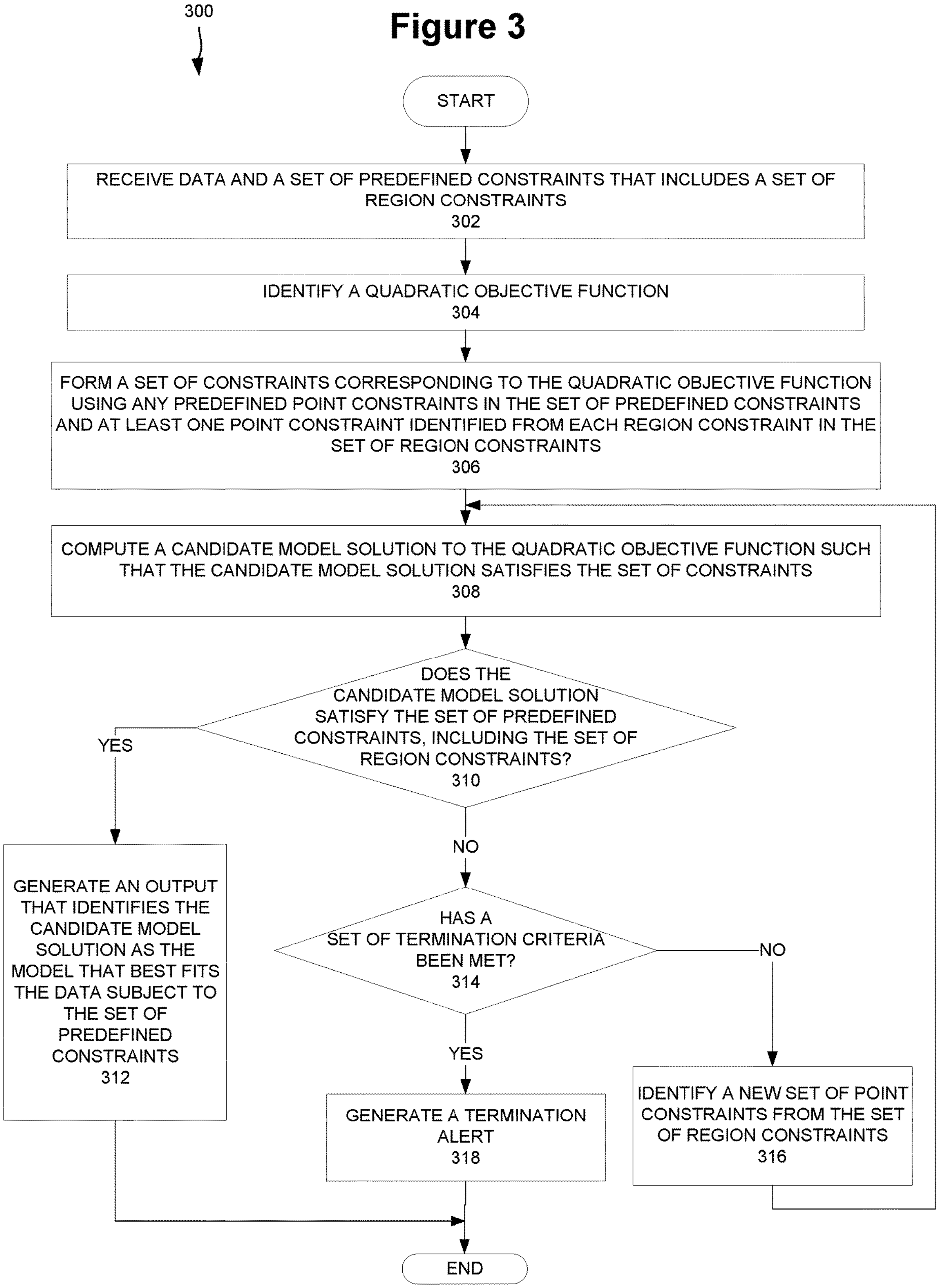
FIG. 3 is a flowchart of a process for generating a model for use in developing a product in accordance with one or more example embodiments.

FIG. 3 is a flowchart of a process for generating a model for use in developing a product in accordance with one or more example embodiments. Process 300 in FIG. 3 may be implemented using modeling system 100 in FIG. 1.

Process 300 may begin by receiving data and a set of predefined constraints that includes a set of region constraints (operation 302). The set of predefined constraints may be, for example, set of predefined constraints 112 in FIG. 1.

A quadratic objective function is identified (operation 304). The quadratic objective function may be, for example, a least squares penalty function (e.g., comprising a weighted residual sum of squares). The quadratic objective function may also include smoothing.

Thereafter, a set of constraints corresponding to the quadratic objective function is formed using any predefined point constraints in the set of predefined constraints and at least one point constraint identified from each region constraint in the set of region constraints (operation 306). In some cases, the set of predefined constraints includes no predefined point constraints. The selection of at least one point constraint from the region constraint in operation 306 is a selection of a subset of point constraints so as to relax the problem of handling the infinite number of point constraints defined by, included in, or otherwise corresponding to the region constraint.

A candidate model solution to the quadratic objective function is then computed such that the candidate model solution satisfies the set of constraints (operation 308). In operation 310, the candidate model solution to the quadratic objective function may be the optimal model in the feasible region of the model space as defined by a coefficient matrix. This optimal model may be the model that minimizes or maximizes the quadratic objective function.

A determination is then made as to whether the candidate model solution satisfies the set of predefined constraints, including the set of region constraints (operation 310). If the candidate model solution satisfies the set of predefined constraints, the process generates an output that identifies the candidate model solution as the model that best fits the data subject to the set of predefined constraints (operation 312), with the process terminating thereafter. In operation 312, the output may be, for example, but is not limited to, a file that enables viewing the model (e.g., a computer-aided design (CAD) file). Such an output may include, for example, a part definition that can be used by a three-dimensional (3D) printing machine to fabricate a part. The output may include a table of data point that can be used to create tables for analysis (e.g., aircraft performance tables).

If the candidate model solution does not meet the set of predefined constraints, a determination may then be made as to whether a set of termination criteria has been met (operation 314). The set of termination criteria may include, for example, but is not limited to, a maximum number of iterations for process 300 having been reached.

If the set of termination criteria has not been met, a new set of point constraints identified from the set of region constraints is added to the set of constraints (operation 316), with the process then returning to operation 308 described above. Otherwise, if the set of termination criteria has been met, the process 300 generates a termination alert (operation 318), with the process terminating thereafter. The termination alert may indicate that a model that fits the data while also meeting the set of predefined constraints has not been found.

Figure 4:
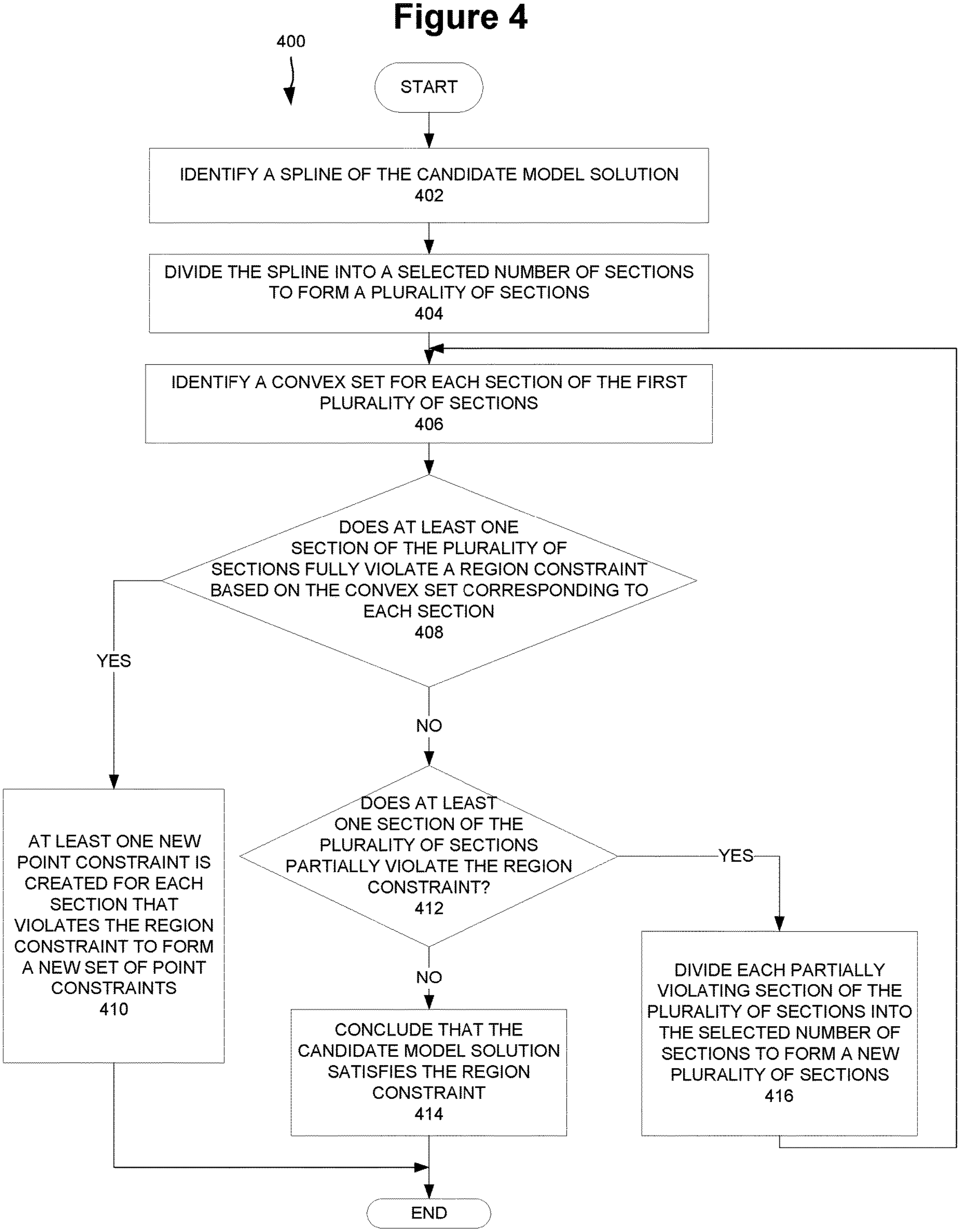
FIG. 4 is a flowchart of a process for determining whether a candidate model solution satisfies a set of predefined constraints in accordance with one or more example embodiments.

FIG. 4 is a flowchart of a process for determining whether a candidate model solution satisfies a set of predefined constraints in accordance with one or more example embodiments. Process 400 in FIG. 4 may be implemented using modeling system 100 in FIG. 1. Further, process 400 may one example of a manner in which operation 310 and operation 316 in FIG. 3 may be implemented. Process 400 is described with respect to determining whether the candidate model solution violates a single region constraint but may be similarly implemented for multiple region constraints. Further, process 400 is described with respect to a single spline of the candidate model solution. But process 400 may be performed for each spline of the candidate model solution sequentially, simultaneously, or in some other manner.

Process 400 may begin by identifying a spline of the candidate model solution (operation 402). The spline is divided into a selected number of sections to form a plurality of sections (operation 404). The selected number of sections may be, for example, two sections, three sections, or some other number of sections. A convex set is identified for each section of the first plurality of sections (operation 406).

A determination is made as to whether at least one section of the plurality of sections fully violates a region constraint based on the convex set corresponding to each section (operation 408). A section violates the region constraint when the entire convex set for that section violates the region constraint. For example, a region constraint may require that the output of the model be equal to or less than a selected value. A section violates this region constraint when the convex set for the section is entirely above the selected value.

If at least one section of the plurality of sections fully violates the region constraint, at least one new point constraint is created for each section that violates the region constraint to form a new set of point constraints (operation 410), with the process terminating thereafter. Operation 410 may include, for example, identifying a point constraint for the mid-point of each section. In some examples, operation 410 includes identifying at least one new point constraint at the point in the section set that most violates the region constraint. In still other examples, operation 410 includes identifying two or more new point constraints for each section. In some cases, operation 410 may only be performed if a set of termination criteria has not been met.

If no section of the plurality of sections fully violates the region constraint, process 400 determines whether at least one section of the plurality of sections partially violates the region constraint (operation 412). A section "partially" violates the constraint when a first portion of the convex set violates the constraint, but a second portion of the convex set does not violate the constraint.

If no section of the plurality of sections potentially violates the region constraint, then a conclusion is made that the candidate model solution satisfies the region constraint (operation 414), with the process terminating thereafter. If, however, at least one section of the plurality of sections potentially violates the region constraint, each potentially violating section of the plurality of sections is divided into the selected number of sections to form a new plurality of sections (operation 416), with the process then returning to operation 406 as described above. Operation 416 may use the same selected number of sections as used in operation 404.

Figure 5:
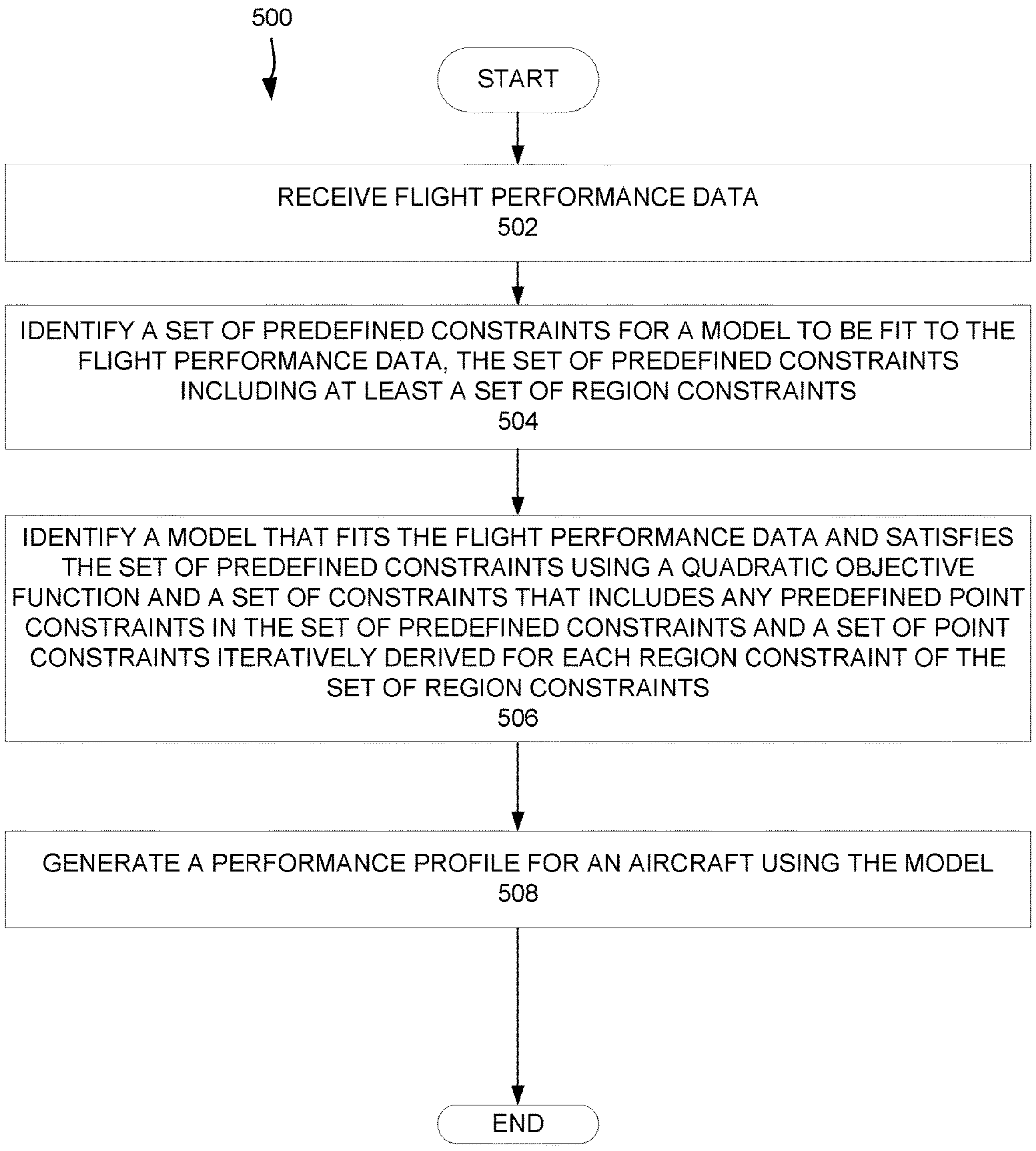
FIG. 5 is a flowchart of process for generating a flight performance model in accordance with one or more example embodiments.

FIG. 5 is a flowchart of process for generating a flight performance model in accordance with one or more example embodiments. Process 500 in FIG. 5 may be implemented using modeling system 100 in FIG. 1. Further, process 500 may be one example of a more specific implementation for process 200 in FIG. 2.

Process 500 may begin by receiving flight performance data (operation 502). The flight performance data may be obtained from various sources including, but not limited to, lookup tables. These tables may have incomplete data. The flight performance data may include, for example, data generated from at least one of a computer simulation, a set of wind tunnel tests, a set of flight tests, or some other source. In one or more embodiments, the flight performance data is generated for an initial or current design of an aircraft, an aircraft part, an aircraft system, an aircraft software component or module, or a combination thereof.

A set of predefined constraints is identified for a model to be fit to the flight performance data, the set of predefined constraints including at least a set of region constraints (operation 504). The set of predefined constraints may include, for example, one or more constraints for speed, drag, rate of climb, takeoff and landing distance, ceiling, payload, range, maneuverability, fuel economy, stability, control, safety, or a combination thereof. For example, at least a portion of the set of predefined constraints may define, for example, an aircraft operating envelope for the aircraft.

A model that fits the flight performance data and satisfies the set of predefined constraints is identified using a quadratic objective function and a set of constraints that includes any predefined point constraints in the set of predefined constraints and a set of point constraints iteratively derived for each region constraint of the set of region constraints (operation 506). Operation 506 may be performed in a manner similar to the process formed by operations 304-318 in FIG. 3.

The model is used to generate a performance profile for an aircraft (operation 508), with the process terminating thereafter. In other examples, operation 508 may be implemented to apply the model in the development of the aircraft in some other manner. For example, operation 508 may be used to assess whether a change needs to be made to the design of the aircraft.

In various examples, the performance profile is used to generate a design for an aircraft based on the performance profile such that the aircraft meets the set of predefined constraints. The aircraft can then be manufactured according to the design. The design may be, for example, a computer-aided design (CAD) model or some other type of three-dimensional design model for the entire aircraft, a portion of the aircraft, or an aircraft part for the aircraft.

In some cases, an aircraft is modified based on the performance profile to form a modified aircraft, where the modified aircraft meets the set of predefined constraints. This modification of the aircraft may be performed by, for example, at least one of adding a retrofit feature to the aircraft, adding an aircraft part to the aircraft, installing a software update in the aircraft, adding a new software to the aircraft, designing a new aircraft feature for the aircraft, manufacturing the new aircraft feature, or installing the new aircraft feature in the aircraft.

Figure 6:
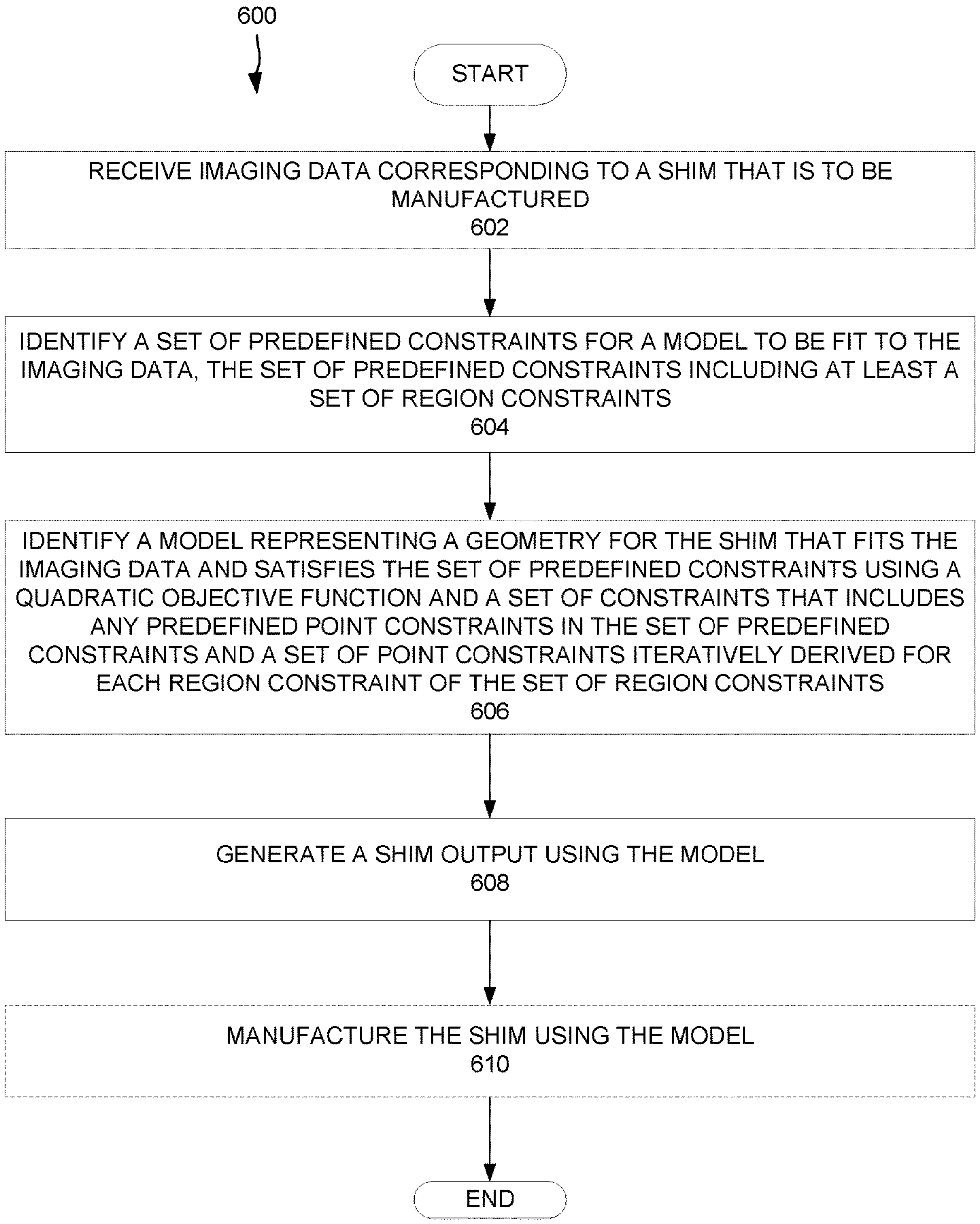
FIG. 6 is a flowchart of process for manufacturing a shim via a model in accordance with one or more example embodiments.

FIG. 6 is a flowchart of process for designing and/or manufacturing a shim via a model in accordance with one or more example embodiments. Process 600 in FIG. 6 may be implemented using modeling system 100 in FIG. 1. Further, process 600 may be one example of a more specific implementation for process 200 in FIG. 2.

Process 600 may begin by receiving imaging data corresponding to a shim that is to be manufactured (operation 602). The imaging data may include, for example, point cloud data obtained from a laser imaging system. The point cloud data may identify a gap that is to be filled by the shim. For example, the laser imaging system may capture a gap between two surfaces. The two surfaces may belong to a same part or different parts. Each of the two surfaces may be a continuous surface or a discontinuous surface formed from multiple individual surfaces or surface portions.

A set of predefined constraints is identified for a model to be fit to the imaging data, the set of predefined constraints including at least a set of region constraints (operation 604). The set of predefined constraints may include for example, at least one of a maximum thickness, a minimum thickness, a minimum radius of curvature for any curved portion of the shim, a stiffness, or some other type of structural limitation for the shim that is to be used to fill the gap. The set of predefined constraints may help ensure that the shim is. designed and manufactured according to what is realistically and practically possible given manufacturing capabilities.

A model representing a geometry for the shim that fits the imaging data and satisfies the set of predefined constraints is identified using a quadratic objective function and a set of constraints that includes any predefined point constraints in the set of predefined constraints and a set of point constraints iteratively derived for each region constraint of the set of region constraints (operation 606). Operation 606 may be performed in a manner similar to the process formed by operations 304-318 in FIG. 3.

The model is then used to generate a shim output for use in manufacturing the shim (operation 608). The shim output is then optionally used to manufacture the shim (operation 610), with the process terminating thereafter.

As one example, in operation 608, the shim output may be a file that includes the model. The shim output may be sent over one or more communications links (e.g., wired, wireless, optical, etc.) to a machining shop for use in machining the shim. For example, the shim output may be sent to a fabrication system that receives and processes the file. The shim output can be used to generate instructions that control the fabrication system to machine the shim. In one or more examples, the fabrication system is a semi-automated or automated system capable of machining, 3D-printing, or otherwise manufacturing the shim based on the shim output received.

Figure 7:
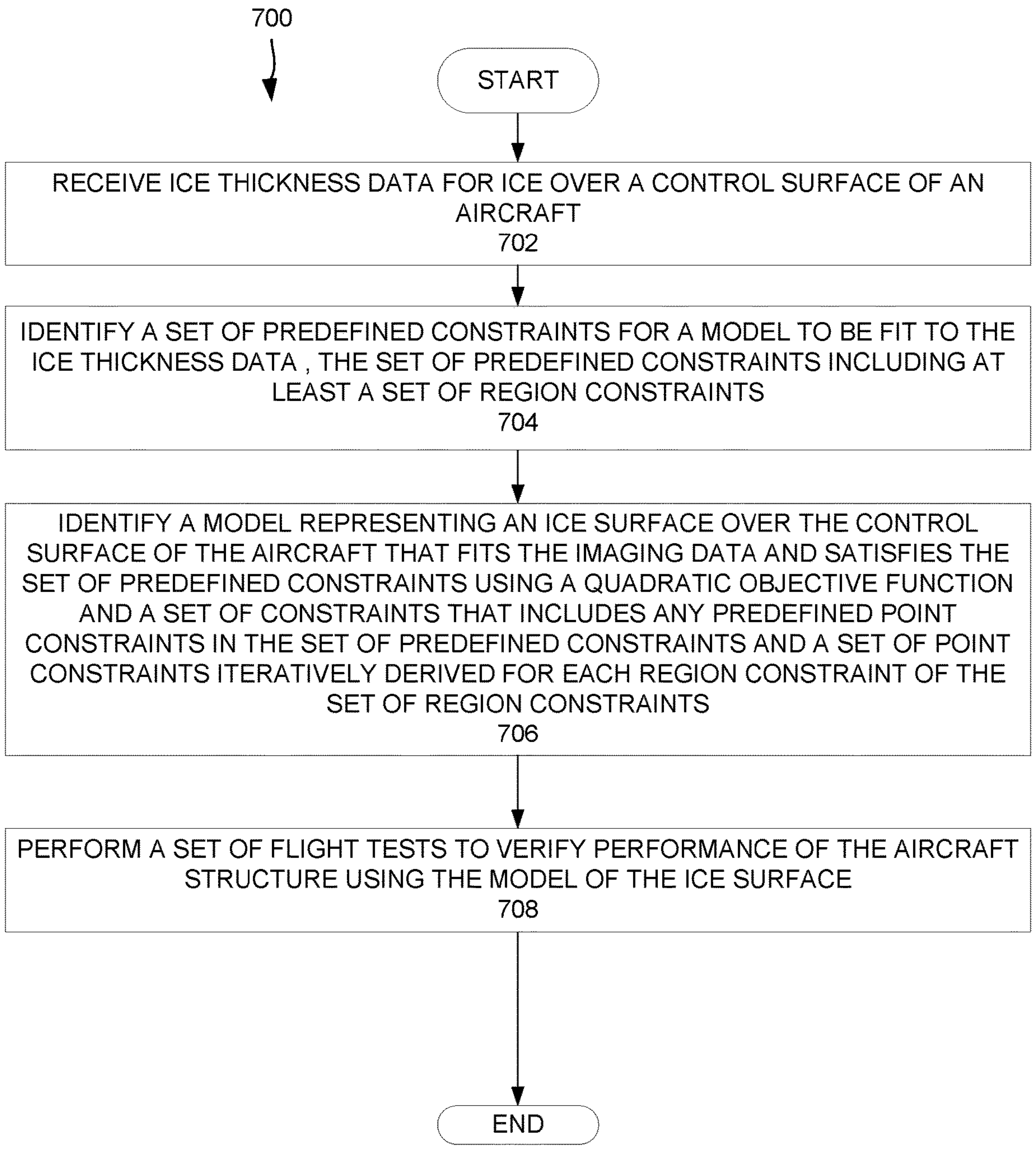
FIG. 7 is a flowchart of process for simulating an ice surface on a control surface of an aircraft via a model in accordance with one or more example embodiments.

FIG. 7 is a flowchart of process for simulating an ice surface on a control surface of an aircraft via a model in accordance with one or more example embodiments. Process 700 in FIG. 7 may be implemented using modeling system 100 in FIG. 1. Further, process 700 may be one example of a more specific implementation for process 200 in FIG. 2.

Process 700 may begin by receiving ice thickness data for ice over an aircraft structure (operation 702). The ice thickness data may comprise, for example, simulated ice thickness data. The aircraft structure may be, for example, a control surface, a wing, a tail, a nose, or some other type of aircraft structure.

A set of predefined constraints is identified for a model to be fit to the ice thickness data, the set of predefined constraints including at least a set of region constraints (operation 704). The set of predefined constraints ensure that ice thickness can be simulated in a manner consistent with manufacturing capabilities for the aircraft structure. In one or more examples, the set of predefined constraints includes at least one of a maximum thickness, a minimum thickness, a regional maximum thickness, a regional minimum thickness, or some other type of constraint.

A model representing an ice surface over the aircraft structure that fits the ice thickness data and satisfies the set of predefined constraints is identified using a quadratic objective function and a set of constraints that includes any predefined point constraints in the set of predefined constraints and a set of point constraints iteratively derived for each region constraint of the set of region constraints (operation 706). Operation 706 may be performed in a manner similar to the process formed by operations 304-318 in FIG. 3.

The model of the ice surface is then used to perform a set of flight tests to verify performance of the aircraft structure (operation 708), with the process terminating thereafter. As one example, in operation 708, the ice surface may be simulated as part of one or more flight tests being used to verify the aircraft structure. The performance of the aircraft structure may be verified for low-speed icing conditions based on the set of flight tests as part of verification of the aircraft.

Figure 8:
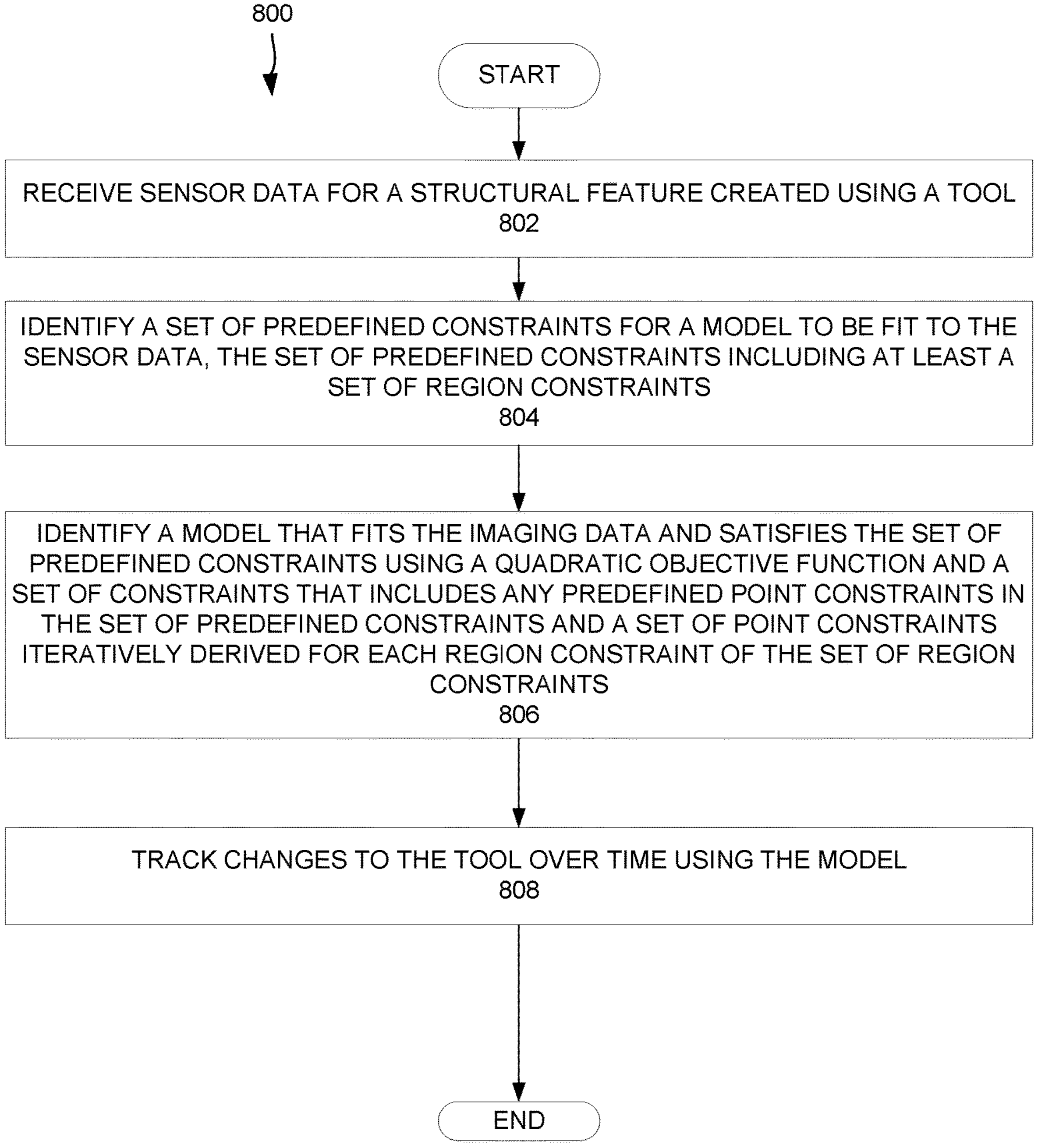
FIG. 8 is a flowchart of process for monitoring wear of a tool in accordance with one or more example embodiments.

FIG. 8 is a flowchart of process for monitoring wear of a tool in accordance with one or more example embodiments. Process 800 in FIG. 8 may be implemented using modeling system 100 in FIG. 1. Further, process 800 may be one example of a more specific implementation for process 200 in FIG. 2.

Process 800 may begin by receiving sensor data for a structural feature created using the tool (operation 802). In one or more examples, the sensor data may be data collected from a probe used to inspect the structural feature. As one specific example, the tool may be a drill bit and the structural feature a drilled hole. The sensor data may be generated by a probe that is passed through the drilled hole to measure a profile or diameter of the drilled hole.

A set of predefined constraints is identified for a model to be fit to the sensor data, the set of predefined constraints including at least a set of region constraints (operation 804). The set of predefined constraints may include, for example, one or more constraints selected to "denoise" the sensor data.

A model that fits the sensor data and satisfies the set of predefined constraints is identified using a quadratic objective function and a set of constraints that includes any predefined point constraints in the set of predefined constraints and a set of point constraints iteratively derived for each region constraint of the set of region constraints (operation 806). Operation 806 may be performed in a manner similar to the process formed by operations 304-318 in FIG. 3. In some examples, the model represents a profile of the tool. In other examples, the model represents a profile of the structural feature created using the tool.

The model is used to track changes to the tool over time (operation 808), with the process terminating thereafter. In particular, the model "denoises" the sensor data and provides a record of the performance of the tool with respect to structural features created using the tool. For example, the model provides an indication of the performance of the tool corresponding to a point in time at which the sensor data was generated (or created). This model may be compared to other similar models generated over time (e.g., for sensor data generated at other points in time) to monitor wear of the tool.

For example, the model may be compared to at least one previous model identified for previously generated sensor data to determine whether a performance of the tool is beyond a threshold level. The at least one previous model may include a baseline model for sensor data generated for a baseline point in time. The baseline point in time may be, for example, an initial use of the tool, an initial use of the tool after repair, an initial use of the tool after servicing, etc.

An alert may be generated indicating a recommended action for the tool in response to a determination that the performance of the tool is beyond the threshold level. When the structural feature is a drilled hole, the threshold level may be, for example, a maximum difference (e.g., a maximum difference selected between about 5 μm to about 10 millimeters) in diameter between different portions of the structural feature, a maximum variation in profile between different portions of the structural feature, or a combination thereof. The recommended action may include, for example, at least one of a replacement of the tool, a repair of the tool, a cleaning of the tool, a servicing of the tool, or another type of action to restore performance of the tool.

Figure 9:
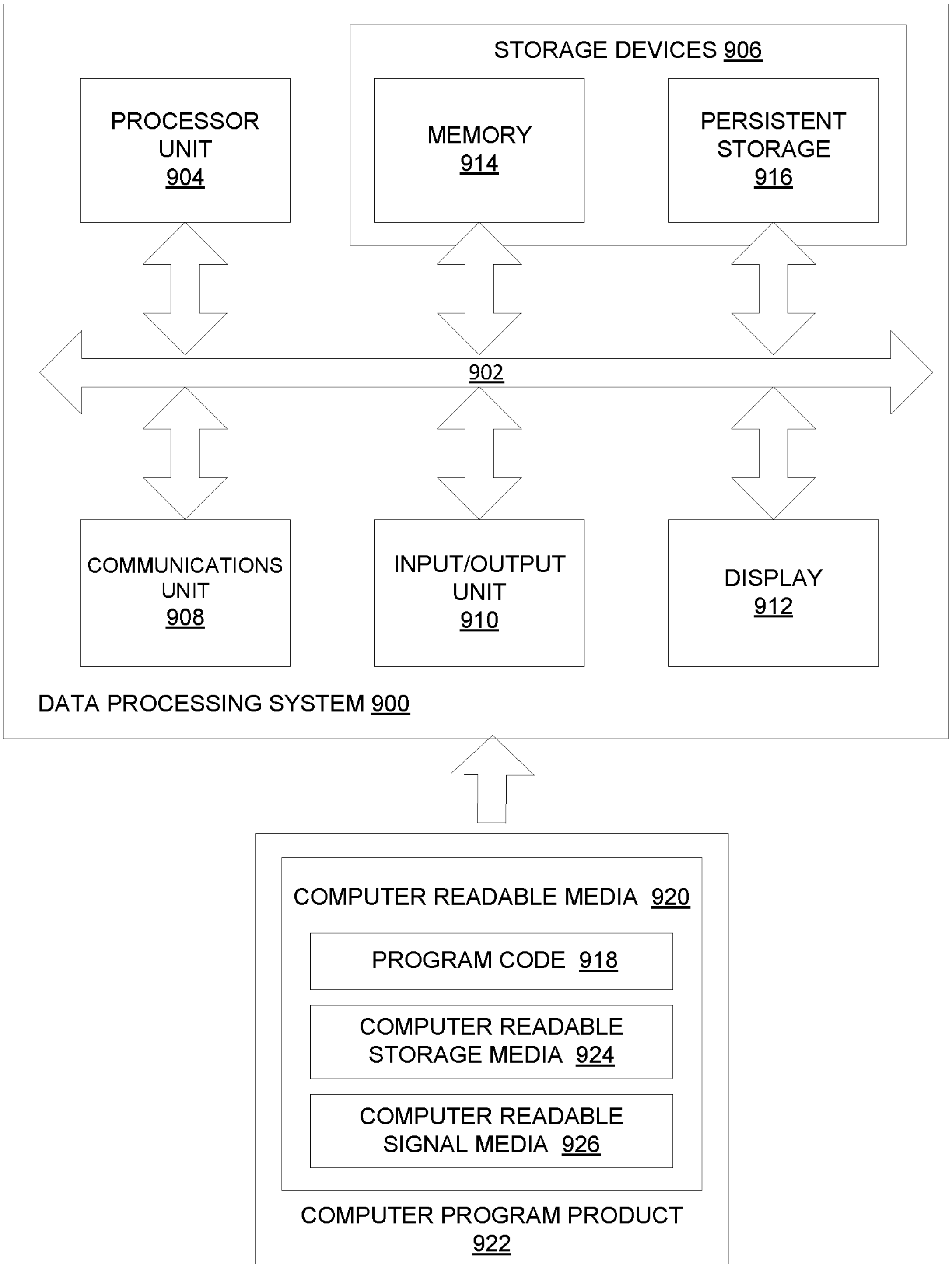
FIG. 9 is a block diagram of a data processing system in accordance with an example embodiment.

Turning now to FIG. 9, an illustration of a data processing system in the form of a block diagram is depicted in accordance with an example embodiment. Data processing system 900 may be used to implement computer system 105 in FIG. 1. As depicted, data processing system 900 includes communications framework 902, which provides communications between processor unit 904, storage devices 906, communications unit 908, input/output unit 910, and display 912. In some cases, communications framework 902 may be implemented as a bus system.

Processor unit 904 is configured to execute instructions for software to perform a number of operations. Processor unit 904 may comprise a number of processors, a multi-processor core, and/or some other type of processor, depending on the implementation. In some cases, processor unit 904 may take the form of a hardware unit, such as a circuit system, an application specific integrated circuit (ASIC), a programmable logic device, or some other suitable type of hardware unit.

Instructions for the operating system, applications, and/or programs run by processor unit 904 may be located in storage devices 906. Storage devices 906 may be in communication with processor unit 904 through communications framework 902. As used herein, a storage device, also referred to as a computer readable storage device, is any piece of hardware capable of storing information on a temporary and/or permanent basis. This information may include, but is not limited to, data, program code, and/or other information.

Memory 914 and persistent storage 916 are examples of storage devices 906. Memory 914 may take the form of, for example, a random access memory or some type of volatile or non-volatile storage device. Persistent storage 916 may comprise any number of components or devices. For example, persistent storage 916 may comprise a hard drive, a flash memory, a rewritable optical disk, a rewritable magnetic tape, or some combination of the above. The media used by persistent storage 916 may or may not be removable.

Communications unit 908 allows data processing system 900 to communicate with other data processing systems and/or devices. Communications unit 908 may provide communications using physical and/or wireless communications links.

Input/output unit 910 allows input to be received from and output to be sent to other devices connected to data processing system 900. For example, input/output unit 910 may allow user input to be received through a keyboard, a mouse, and/or some other type of input device. As another example, input/output unit 910 may allow output to be sent to a printer connected to data processing system 900.

Display 912 is configured to display information to a user. Display 912 may comprise, for example, without limitation, a monitor, a touch screen, a laser display, a holographic display, a virtual display device, and/or some other type of display device.

In one or more examples, the processes of the different example embodiments may be performed by processor unit 904 using computer-implemented instructions. These instructions may be referred to as program code, computer usable program code, or computer readable program code and may be read and executed by one or more processors in processor unit 904.

In these examples, program code 918 is located in a functional form on computer readable media 920, which is selectively removable, and may be loaded onto or transferred to data processing system 900 for execution by processor unit 904. Program code 918 and computer readable media 920 together form computer program product 922. In one or more examples, computer readable media 920 may be computer readable storage media 924 or computer readable signal media 926.

Computer readable storage media 924 is a physical or tangible storage device used to store program code 918 rather than a medium that propagates or transmits program code 918. Computer readable storage media 924 may be, for example, without limitation, an optical or magnetic disk or a persistent storage device that is connected to data processing system 900.

Alternatively, program code 918 may be transferred to data processing system 900 using computer readable signal media 926. Computer readable signal media 926 may be, for example, a propagated data signal containing program code 918. This data signal may be an electromagnetic signal, an optical signal, and/or some other type of signal that can be transmitted over physical and/or wireless communications links.

The illustration of data processing system 900 in FIG. 9 is not meant to provide architectural limitations to the manner in which the example embodiments may be implemented. The different example embodiments may be implemented in a data processing system that includes components in addition to or in place of those illustrated for data processing system 900. Further, components shown in FIG. 9 may be varied from the examples shown.

Figure 10:
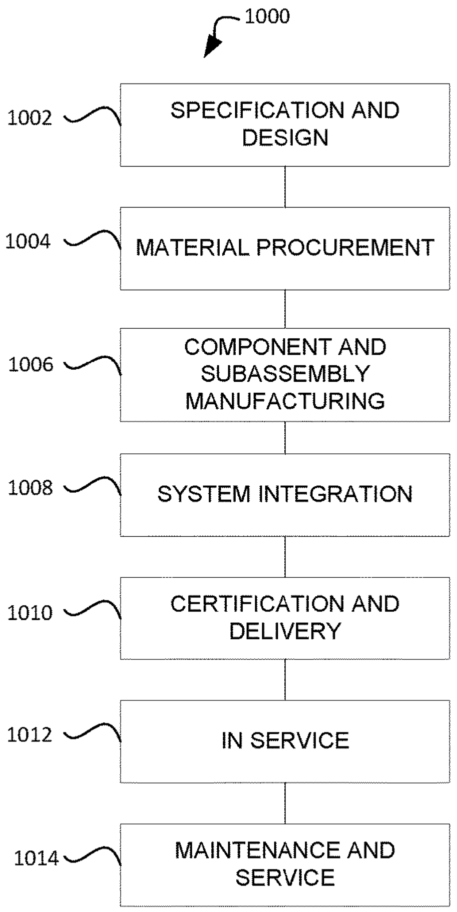
FIG. 10 is an illustration of an aircraft manufacturing and service method in accordance with an example embodiment.
Figure 11:
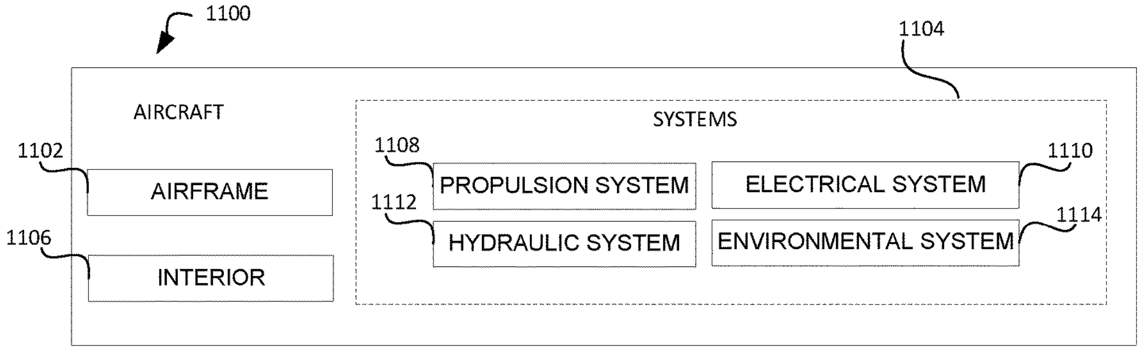
FIG. 11 is a block diagram of an aircraft in accordance with an example embodiment.

Example embodiments of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an example embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an example embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different example embodiments may be applied to other industries, such as the automotive industry.

Apparatuses and methods embodied herein may be employed during at least one of the stages of aircraft manufacturing and service method 1000 in FIG. 10. In particular, modeling system 102 from FIG. 1 may be used to generate model 102 during or for use during any one of the stages of aircraft manufacturing and service method 1000. For example, without limitation, model 102 may be used during at least one of component and subassembly manufacturing 1006, system integration 1008, certification and delivery 1010, routine maintenance and service 1014, or some other stage of aircraft manufacturing and service method 1000. Still further, model 102 generated via modeling system 100 may be used to manufacture one or more aircraft structures of aircraft 1100 such as, but not limited to, one or more structures of airframe 1102, interior 1106, or both of aircraft 1100 in FIG. 11. In some examples, model 102 may be used to analyze performance of aircraft 1100.

In one or more example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012 and/or during maintenance and service 1014 in FIG. 10. The use of a number of the different example embodiments may substantially expedite the assembly of and/or reduce the cost of aircraft 1100. Further, one or more embodiments described herein may be used as part of propulsion system 1108 of aircraft 1100.

The flowcharts and block diagrams in the different depicted embodiments illustrate the architecture, functionality, and operation of some possible implementations of apparatuses and methods in an example embodiment. In this regard, each block in the flowcharts or block diagrams may represent a module, a segment, a function, and/or a portion of an operation or step.

In some alternative implementations of an example embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

Further, as used herein, a "set of" items includes one or more items. For example, a set of conditions may be a single condition or multiple conditions. A set of point constraints may be a single point constraint or multiple point constraints.

Some embodiments of the invention are defined by the following numbered clauses:

Clause 1. A method for developing a product using a model that satisfies a region constraint, the method comprising:

receiving data;

identifying the region constraint; and identifying the model that fits the data and satisfies the region constraint using a quadratic objective function and a set of point constraints derived iteratively from the region constraint.

2. The method of clause 1, wherein identifying the model comprises:

forming a set of constraints using the set of point constraints identified from the region constraint.

3. The method of clause 2, wherein identifying the model further comprises:

computing a candidate model solution to the quadratic objective function such that the candidate model solution satisfies the set of constraints; and determining whether the candidate model solution satisfies the region constraint.

4. The method of clause 3, further comprising:

generating an output that identifies the candidate model solution as the model that fits the data subject to the region constraint in response to a determination that the candidate model solution satisfies the region constraint.

5. The method of clause 3, wherein identifying the model further comprises:

adding a new set of point constraints identified from the region constraint to the set of constraints in response to a determination that the candidate model solution does not satisfy the region constraint; and repeating the step of computing the candidate model solution to the quadratic objective function such that the candidate model solution satisfies the set of constraints using the set of constraints that includes the new set of point constraints.

6. The method of clause 1, wherein the quadratic objective function is convex.

7. The method of clause 1, further comprising:

manufacturing the product based on the model.

8. The method of clause 1, further comprising:

analyzing a performance of the product using the model.

9. The method of clause 1, wherein the model represents a geometry for a shim and further comprising:

manufacturing the shim having the geometry based on the model.

10. The method of clause 1, wherein the product is an aircraft structure for an aircraft and wherein the model represents an ice surface over the aircraft structure and further comprising:

performing a flight test using the model of the ice surface to verify performance of the aircraft.

11. A method for generating a model that satisfies a set of predefined constraints, the method comprising:

receiving data and the set of predefined constraints, the set of predefined constraints including a set of region constraints;

forming a set of constraints corresponding to a quadratic objective function using any predefined point constraints in the set of predefined constraints and at least one point constraint identified from each region constraint in the set of region constraints;

computing a candidate model solution to the quadratic objective function such that the candidate model solution satisfies the set of constraints; and determining whether the candidate model solution satisfies the set of predefined constraints, including the set of region constraints;

adding a new set of point constraints identified from the region constraint to the set of constraints in response to a determination that the model does not satisfy the region constraint; and repeating the steps of computing the candidate model solution to the quadratic objective function and determining whether the candidate model solution satisfies the set of predefined constraints based on the set of constraints that includes the new set of point constraints.

12. The method of clause 11, wherein determining whether the candidate model solution satisfies the set of predefined constraints comprises:

dividing a spline of the candidate model solution into a selected number of sections to form a plurality of sections; and identifying a convex set for each section of the plurality of sections.

13. The method of clause 12, wherein determining whether the candidate model solution satisfies the set of predefined constraints further comprises:

determining that at least one section of the plurality of sections fully violates the region constraint based on the convex set corresponding to each section of the plurality of sections; and creating at least one new point constraint for any section of the plurality of sections that violates the region constraint to form the new set of point constraints.

14. The method of clause 12, wherein determining whether the candidate model solution satisfies the set of predefined constraints further comprises:

determining that at least one section of the plurality of sections partially violates the region constraint based on the convex set corresponding to each section of the plurality of sections; and dividing each partially violating section of the plurality of sections into the selected number of sections to form a new plurality of sections; and repeating the step of identifying the convex set for each section of the new plurality of sections.

15. A computer system comprising:

a processor configured to:

receive data;

identify a region constraint; and identify a model that fits the data and satisfies the region constraint using a quadratic objective function and a set of point constraints derived iteratively from the region constraint.

16. The computer system of clause 15, wherein the processor is further configured to form a set of constraints using the set of point constraints identified from the region constraint.

17. The computer system of clause 16, wherein the processor is configured to identify the model by computing a candidate model solution to the quadratic objective function such that the candidate model solution satisfies the set of constraints; and determining whether the candidate model solution satisfies the region constraint.

18. The computer system of clause 17, wherein the processor is further configured to generate an output that identifies the candidate model solution as the model that fits the data subject to the region constraint in response to a determination that the candidate model solution satisfies the region constraint.

19. The computer system of clause 17, wherein the processor is further configured to identify the model by adding a new set of point constraints identified from the region constraint to the set of constraints in response to a determination that the candidate model solution does not satisfy the region constraint; and repeat the step of computing the candidate model solution to the quadratic objective function such that the candidate model solution satisfies the set of constraints using the set of constraints that includes the new set of point constraints.

20. The computer system of clause 15, wherein the quadratic objective function is convex.

21. The computer system of clause 15, wherein the model represents a geometry of a shim.

22. The computer system of clause 15, wherein the model represents an ice surface.

23. The computer system of clause 15, wherein the model represents flight performance.

24. A method for evaluating flight performance, the method comprising:

receiving flight performance data;

identifying a set of predefined constraints for a model to be fit to the flight performance data, the set of predefined constraints including at least a set of region constraints;

identifying a model that fits the flight performance data and satisfies the set of predefined constraints using a quadratic objective function and a set of constraints that includes any predefined point constraints in the set of predefined constraints and a set of point constraints iteratively derived for each region constraint of the set of region constraints; and generating a performance profile for an aircraft using the model.

25. The method of clause 24, wherein the quadratic objective function is convex and wherein identifying the model comprises:

forming a set of constraints using the set of point constraints identified from the region constraint;

computing a candidate model solution to the quadratic objective function such that the candidate model solution satisfies the set of constraints; and determining whether the candidate model solution satisfies the region constraint.

26. The method of clause 25, further comprising:

generating an output that identifies the candidate model solution as the model that fits the data subject to the region constraint in response to a determination that the candidate model solution satisfies the region constraint.

27. The method of clause 25, wherein identifying the model further comprises:

adding a new set of point constraints identified from the region constraint to the set of constraints in response to a determination that the candidate model solution does not satisfy the region constraint; and repeating the step of computing the candidate model solution to the quadratic objective function such that the candidate model solution satisfies the set of constraints using the set of constraints that includes the new set of point constraints.

28. The method of clause 24, wherein the flight performance data comprises data generated from at least one of a computer simulation, a set of wind tunnel tests, or a set of flight tests.

29. The method of clause 24, further comprising:

generating a design for an aircraft based on the performance profile such that the aircraft meets the set of predefined constraints.

30. The method of clause 29, further comprising:

manufacturing the aircraft according to the design.

31. The method of clause 24, further comprising:

modifying an aircraft based on the performance profile to form a modified aircraft such that the modified aircraft meets the set of predefined constraints.

32. The method of clause 31, wherein modifying the aircraft comprises at least one of adding a retrofit feature to the aircraft, adding an aircraft part to the aircraft, installing a software update in the aircraft, adding a new software to the aircraft, designing a new aircraft feature for the aircraft, manufacturing the new aircraft feature, or installing the new aircraft feature in the aircraft.

33. A method for manufacturing a shim via a model, the method comprising:

receiving imaging data corresponding to a shim that is to be manufactured;

identifying a set of predefined constraints for a model to be fit to the imaging data, the set of predefined constraints including at least a set of region constraints;

identifying a model representing a geometry for the shim that fits the imaging data and satisfies the set of predefined constraints using a quadratic objective function and a set of constraints that includes any predefined point constraints in the set of predefined constraints and a set of point constraints iteratively derived for each region constraint of the set of region constraints; and generating a shim output, using the model, for use in manufacturing the shim.

34. The method of clause 34, further comprising:

manufacturing the shim using the shim output.

35. The method of clause 34, wherein the quadratic objective function is convex and wherein identifying the model comprises:

forming a set of constraints using the set of point constraints identified from the region constraint;

computing a candidate model solution to the quadratic objective function such that the candidate model solution satisfies the set of constraints; and determining whether the candidate model solution satisfies the region constraint.

36. The method of clause 35, further comprising:

generating an output that identifies the candidate model solution as the model that fits the data subject to the region constraint in response to a determination that the candidate model solution satisfies the region constraint.

37. The method of clause 35, wherein identifying the model further comprises:

adding a new set of point constraints identified from the region constraint to the set of constraints in response to a determination that the candidate model solution does not satisfy the region constraint; and repeating the step of computing the candidate model solution to the quadratic objective function such that the candidate model solution satisfies the set of constraints using the set of constraints that includes the new set of point constraints.

38. The method of clause 33, wherein the imaging data comprises point cloud data obtained from a laser imaging system and captures a gap within a structure that is to be filled by the shim.

39. The method of clause 33, wherein the set of predefined constraints includes at least one of a maximum thickness, a minimum thickness, a minimum radius of curvature for any curved portion of the shim, or a stiffness.

40. The method of clause 33, wherein the output includes a design for the shim and further comprising:

sending the output over at least one communications link to a fabrication system that is configured to machine the shim according to the design.

41. A method for simulating an ice surface on a control surface of an aircraft via a model, the method comprising:

receiving ice thickness data for ice over an aircraft structure;

identifying a set of predefined constraints for a model to be fit to the ice thickness data, the set of predefined constraints including at least a set of region constraints;

identifying a model representing an ice surface over the aircraft structure that fits the ice thickness data and satisfies the set of predefined constraints using a quadratic objective function and a set of constraints that includes any predefined point constraints in the set of predefined constraints and a set of point constraints iteratively derived for each region constraint of the set of region constraints; and performing a set of flight tests to verify performance of the aircraft structure using the model of the ice surface.

42. The method of clause 41, wherein the quadratic objective function is convex and wherein identifying the model comprises:

forming a set of constraints using the set of point constraints identified from the region constraint;

computing a candidate model solution to the quadratic objective function such that the candidate model solution satisfies the set of constraints; and determining whether the candidate model solution satisfies the region constraint.

43. The method of clause 42, further comprising:

generating an output that identifies the candidate model solution as the model that fits the data subject to the region constraint in response to a determination that the candidate model solution satisfies the region constraint.

44. The method of clause 42, wherein identifying the model further comprises:

adding a new set of point constraints identified from the region constraint to the set of constraints in response to a determination that the candidate model solution does not satisfy the region constraint; and repeating the step of computing the candidate model solution to the quadratic objective function such that the candidate model solution satisfies the set of constraints using the set of constraints that includes the new set of point constraints.

45. The method of clause 41, wherein the ice thickness data comprises simulated ice thickness data.

46. The method of clause 41, wherein the aircraft structure is selected from a group consisting of a control surface, a wing, a tail, or a nose.

47. The method of clause 41, wherein performing the set of flight tests comprises:

simulating the ice surface using the model as part of the flight tests, wherein the model of the ice surface meets the set of predefined constraints.

48. The method of clause 47, further comprising:

verifying the performance of the aircraft structure in low-speed icing conditions based on the set of flight tests as part of verification of the aircraft.

49. A method for monitoring wear of a tool, the method comprising:
receiving sensor data for a structural feature created using the tool;
identifying a set of predefined constraints for a model to be fit to the sensor data, the set of predefined constraints including at least a set of region constraints;
identifying a model that fits the sensor data and satisfies the set of predefined constraints using a quadratic objective function and a set of constraints that includes any predefined point constraints in the set of predefined constraints and a set of point constraints iteratively derived for each region constraint of the set of region constraints; and
track changes to the tool over time using the model.

50. The method of clause 49, wherein the quadratic objective function is convex and wherein identifying the model comprises:
forming a set of constraints using the set of point constraints identified from the region constraint;
computing a candidate model solution to the quadratic objective function such that the candidate model solution satisfies the set of constraints; and
determining whether the candidate model solution satisfies the region constraint.

51. The method of clause 50, further comprising:
generating an output that identifies the candidate model solution as the model that fits the data subject to the region constraint in response to a determination that the candidate model solution satisfies the region constraint.

52. The method of clause 50, wherein identifying the model further comprises:
adding a new set of point constraints identified from the region constraint to the set of constraints in response to a determination that the candidate model solution does not satisfy the region constraint; and
repeating the step of computing the candidate model solution to the quadratic objective function such that the candidate model solution satisfies the set of constraints using the set of constraints that includes the new set of point constraints.

53. The method of clause 49, wherein the sensor data comprises data generated using a probe configured to inspect the structural feature.

54. The method of clause 49, wherein the tool is a drill bit, the structural feature is a drilled hole made using the drill bit, and the sensor data is generated using a probe passed through the drilled hole to measure at least one of a profile or a diameter of the drilled hole.

55. The method of clause 54, wherein the model denoises the sensor data and provides an indication of the performance of the tool corresponding to a point in time at which the sensor data was generated.

56. The method of clause 49, wherein tracking the changes to the tool over time comprises:
comparing the model to at least one previous model identified for previously generated sensor data to determine whether a performance of the tool is beyond a threshold level.

57. The method of clause 56, wherein the previously generated sensor data was generated for a baseline point in time.

58. The method of clause 56, further comprising:
generating an alert indicating a recommended action for the tool in response to a determination that the performance of the tool is beyond the threshold level.

59. The method of clause 49, further comprising:
generating an alert indicating a recommended action for the tool in response to a determination that the performance of the tool is beyond a threshold level.

60. The method of clauses 58 or 59, wherein the recommended action comprises at least one of a replacement of the tool, a repair of the tool, a cleaning of the tool, or a servicing of the tool.

61. The method of clauses 56, 58, or 59, wherein the structural feature is a drilled hole and the threshold level is a maximum difference in diameter between different portions of the structural feature.

62. The method of clauses 56, 58, or 59, wherein the structural feature is a drilled hole and the threshold level is a maximum variation in profile between different portions of the structural feature.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
receiving, by a device, data;
identifying, by the device, a set of predefined constraints for a model to be fit to the data, the set of predefined constraints including at least a region constraint;
identifying, by the device, the model that fits the data and satisfies the set of predefined constraints using a quadratic objective function and a set of point constraints derived iteratively from the region constraint,
wherein the quadratic objective function includes a least squares penalty function; and
manufacturing, by the device, a product based on the model.

2. The method of claim 1, wherein identifying, a set of predefined constraints for a model comprises:
forming a set of constraints using the set of point constraints identified from the region constraint.

3. The method of claim 1, wherein the quadratic objective function is convex.

4. The method of claim 1, further comprising:
analyzing a performance of the product using the model.

5. The method of claim 1, wherein the model represents a geometry for a shim and further comprising:
manufacturing the shim having the geometry based on the model.

6. The method of claim 1, wherein the product is an aircraft structure for an aircraft and wherein the model represents an ice surface over the aircraft structure and further comprising:
performing a flight test using the model of the ice surface to verify performance of the aircraft.

7. The method of claim 1, wherein the region constraint specifies that a part maintains a certain thickness over a defined region.

8. The method of claim 2, wherein identifying the model further comprises:

computing a candidate model solution to the quadratic objective function such that the candidate model solution satisfies the set of constraints; and determining whether the candidate model solution satisfies the region constraint.

9. The method of claim 8, further comprising:

generating an output that identifies the candidate model solution as the model that fits the data subject to the region constraint in response to a determination that the candidate model solution satisfies the region constraint.

10. The method of claim 8, wherein identifying the model further comprises:

adding a new set of point constraints identified from the region constraint to the set of constraints in response to a determination that the candidate model solution does not satisfy the region constraint; and repeating the step of computing the candidate model solution to the quadratic objective function such that the candidate model solution satisfies the set of constraints using the set of constraints that includes the new set of point constraints.

11. A method comprising:

receiving, by a device, data and a set of predefined constraints, the set of predefined constraints including a set of region constraints;

forming, by the device, a set of constraints corresponding to a quadratic objective function using any predefined point constraints in the set of predefined constraints and at least one point constraint identified from a region constraint in the set of region constraints, wherein the quadratic objective function includes a least squares penalty function;

computing, by the device, a candidate model solution to the quadratic objective function such that the candidate model solution satisfies the set of constraints;

determining, by the device, whether the candidate model solution satisfies the set of predefined constraints, including the set of region constraints;

adding, by the device, a new set of point constraints identified from the region constraint to the set of constraints in response to a determination that the candidate model solution does not satisfy the region constraint;

repeating, by the device, the steps of computing the candidate model solution to the quadratic objective function and determining whether the candidate model solution satisfies the set of predefined constraints based on the set of constraints that includes the new set of point constraints; and performing, by the device, a flight test using the candidate model solution.

12. The method of claim 11, wherein determining whether the candidate model solution satisfies the set of predefined constraints comprises:

dividing a spline of the candidate model solution into a selected number of sections to form a plurality of sections; and identifying a convex set for each section of the plurality of sections.

13. The method of claim 12, wherein determining whether the candidate model solution satisfies the set of predefined constraints further comprises:

determining that at least one section of the plurality of sections fully violates the region constraint based on the convex set corresponding to each section of the plurality of sections; and creating at least one new point constraint for any section of the plurality of sections that violates the region constraint to form the new set of point constraints.

14. The method of claim 12, wherein determining whether the candidate model solution satisfies the set of predefined constraints further comprises:

determining that at least one section of the plurality of sections partially violates the region constraint based on the convex set corresponding to each section of the plurality of sections;

dividing each partially violating section of the plurality of sections into the selected number of sections to form a new plurality of sections; and repeating the step of identifying the convex set for each section of the new plurality of sections.

15. A computer system comprising:

a processor configured to:

receive image data;

identify a set of predefined constraints for a model to fit to the image data, the set of predefined constraints including at least a region constraint;

identify a set of predefined constraints for a model that fits the image data and satisfies the set of predefined constraints using a quadratic objective function and a set of point constraints derived iteratively from the region constraint;

and manufacture a product based on the model.

16. The computer system of claim 15, wherein the processor is further configured to:

form a set of constraints using the set of point constraints identified from the region constraint.

17. The computer system of claim 15, wherein the quadratic objective function is convex.

18. The computer system of claim 16, wherein the processor is configured to:

identify the model by computing a candidate model solution to the quadratic objective function such that the candidate model solution satisfies the set of constraints; and determine whether the candidate model solution satisfies the region constraint.

19. The computer system of claim 18, wherein the processor is further configured to:

generate an output that identifies the candidate model solution as the model that fits the image data subject to the region constraint in response to a determination that the candidate model solution satisfies the region constraint.

20. The computer system of claim 18, wherein the processor is further configured to;

identify the model by adding a new set of point constraints identified from the region constraint to the set of constraints in response to a determination that the candidate model solution does not satisfy the region constraint; and repeat the step of computing the candidate model solution to the quadratic objective function such that the candidate model solution satisfies the set of constraints using the set of constraints that includes the new set of point constraints.

* * * * *